(12) United States Patent
Chao et al.

(10) Patent No.: US 10,298,550 B2
(45) Date of Patent: May 21, 2019

(54) PACKET FLOW IN AN OVERLAY NETWORK

(71) Applicant: INTERNATIONAL BUSINESS MACHINES CORPORATION, Armonk, NY (US)

(72) Inventors: Chih-Wen Chao, Taipei (TW); Cheng-Ta Lee, Taipei (TW); Yin Lee, Taipei (TW); Wei-Shiau Suen, Taichung (TW); Ming-Hsun Wu, New Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 279 days.

(21) Appl. No.: 15/272,471

(22) Filed: Sep. 22, 2016

(65) Prior Publication Data
US 2018/0083925 A1   Mar. 22, 2018

(51) Int. Cl.
*H04L 29/06* (2006.01)
*G06F 3/06* (2006.01)
*G06F 12/14* (2006.01)
*H04L 12/815* (2013.01)
*H04L 12/46* (2006.01)

(52) U.S. Cl.
CPC .......... *H04L 63/0428* (2013.01); *G06F 3/061* (2013.01); *G06F 3/065* (2013.01); *G06F 3/067* (2013.01); *G06F 3/0655* (2013.01); *G06F 12/1408* (2013.01); *H04L 12/4633* (2013.01); *H04L 47/22* (2013.01); *H04L 63/20* (2013.01); *H04L 69/22* (2013.01); *G06F 2212/402* (2013.01)

(58) Field of Classification Search
None
See application file for complete search history.

(56) References Cited

U.S. PATENT DOCUMENTS

| 8,472,438 | B2 | 6/2013 | Kini et al. | |
|---|---|---|---|---|
| 9,106,257 | B1 | 8/2015 | Pohlack et al. | |
| 2006/0245373 | A1* | 11/2006 | Bajic | H04W 8/12 370/254 |
| 2009/0154460 | A1* | 6/2009 | Varela | H04L 69/04 370/392 |

(Continued)

*Primary Examiner* — Kaveh Abrishamkar
(74) *Attorney, Agent, or Firm* — Cantor Colburn LLP; Jeffrey S LaBaw

(57) ABSTRACT

A computer program product for transmitting data flow in a network between two resources using a processing circuit to perform a method which includes obtaining a data record from a first resource, storing the data record and an associated data record identifier in a first memory, transmitting the data record from a first network to a second network, storing the data record and an associated data record identifier in a second memory, determining by an inline service provider whether the data record is suitable for transmission from a first resource to a second resource; based on determining that the data record is suitable for transmission by the inline service provider transmitting only the data record identifier stored in the second memory to the first switch and retrieving the data record stored in the first memory associated with the data record identifier for transmission to the second resource.

17 Claims, 4 Drawing Sheets

(56) References Cited

U.S. PATENT DOCUMENTS

| | | | |
|---|---|---|---|
| 2013/0160122 A1* | 6/2013 | Choi | H04L 63/1416 726/23 |
| 2013/0208893 A1* | 8/2013 | Shablygin | H04L 9/0822 380/277 |
| 2013/0347094 A1* | 12/2013 | Bettini | H04L 63/0245 726/11 |
| 2014/0095459 A1* | 4/2014 | Eshel | G06F 17/30079 707/703 |
| 2015/0312054 A1 | 10/2015 | Barabash et al. | |
| 2015/0381494 A1 | 12/2015 | Cherian et al. | |
| 2016/0294710 A1* | 10/2016 | Sreeramoju | H04L 47/2483 |

* cited by examiner

PACKET FLOW IN AN OVERLAY NETWORK

BACKGROUND

Computer systems typically utilize multiple networks for data packet flow. Overhead to the system is experienced when the data packets must flow from one network to another. Accordingly, there is a need to reduce the overhead to a computer system when data packets flow between networks.

SUMMARY

One embodiment includes a computer-implemented method for data flow in a network between two resources which includes obtaining, using a processor system, a data record from a first resource in response to a request from a second resource. The data record and an associated data record identifier are stored in a first memory. The data record and associated data record identifier are transmitted from a first network to a second network. The data record and associated data record identifier are stored in a second memory associated with the second network. An inline service provider determines whether the data record is suitable for transmission from the first resource to the second resource. Based on a determination that the data record is suitable for transmission by the inline service provider, transmitting only the data record identifier stored in the second memory to the first switch. The data record stored in the first memory associated with the data record identifier is retrieved for transmission to the second resource.

One or more embodiments include a system for transmitting data flow in a network. The system includes a first resource having a data record and a second resource in communication with the first resource via a first network. A first switch communicates with the first network with a second network. A first memory is in communication with the first resource and first switch for receiving a data record from the first resource and storing a copy of the data for potential subsequent transmission to the second resource if the transfer of the data is approved by an inline service provider. A second switch is in communication with the first switch for receiving the data record. An inline service provider provides services on the data resulting in processed data. A second memory is in communication with the second switch for storing a copy of the data record for subsequent comparison upon receiving the processed data. A processor is configured to compare the processed data with the copy of the stored data record to determine if the stored data record is suitable for transmission to the second resource. The processor is also configured to transmit a data record identifier identifying the data record stored in the first memory when the data record is determined suitable for transmission to the second resource. The data record identifier being of a less size than the data record.

One or more embodiments of the present disclosure present a computer program product for transmitting data flow in a network between two resources, the computer program product comprising a computer readable storage medium having program instructions embodied therewith, wherein the computer readable storage medium is not a transitory signal per se, the program instructions readable by a processing circuit to cause the processing circuit to perform a method for managing data flow in a network between two resources which includes obtaining, using a processor system, a data record from a first resource in response to a request from a second resource. The data record and an associated data record identifier are stored in a first memory. The data record and associated data record identifier are transmitted from a first network to a second network. The data record and associated data record identifier are stored in a second memory associated with the second network. An inline service provider determines whether the data record is suitable for transmission from the first resource to the second resource. Based on a determination that the data record is suitable for transmission by the inline service provider, transmitting only the data record identifier stored in the second memory to the first switch. The data record stored in the first memory associated with the data record identifier is retrieved for transmission to the second resource.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of the present disclosure include systems, computer program products, and method for packet flow optimization in an overlay network. When data is delivered from one resource to another, especially when the data is in a cloud environment, inline service providers are routinely utilized for ensuring the integrity of the data. The data is packed and transmitted from a source over a first overlay network utilizing switches to the inline service provider. Once the inline service provider checks the integrity of the data, the data packets are retransmitted back over a second overlay network utilizing switches to a recipient resource. In exemplary embodiments, the data packets are stored in respective memories associated with both networks to eliminate the need to return complete data packets once the integrity has been tested. This process reduces the overhead resources required to transmit the data between the respective networks via the switching network due to the reduction in data being transmitted and the elimination of the need to encrypt and encapsulate the data after being processed by the inline service provider.

Figure 1:
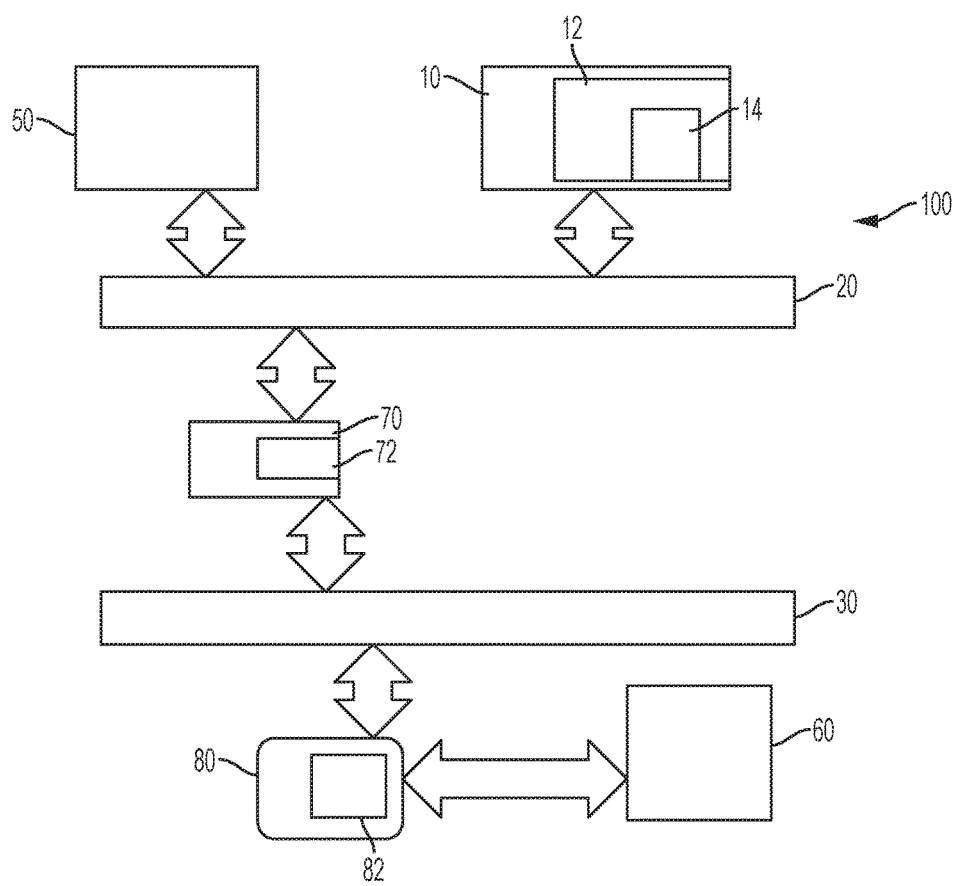
FIG. 1 shows a computer system according to one or more embodiments.

Turning now to a more detailed description of the present disclosure, there is shown in FIG. 1 a computer system 100 having a first computing environment 10. The first computing environment 10 may be any type of computing device capable of communicating with another user device via a network 20. The computing environment 10 includes a memory 12 which contains a plurality of data records 14. As shown in FIG. 1, the computer system 100 includes a second computing environment 50, which is in communication with the first computing environment via the network 20. In one embodiment, the network 20 may include a hypervisor or virtual machine monitor and first and second computing environments may be separate tenants associated with a host machine. In one embodiment, the first computing environment may be networked to additional resources or may part of a cloud computing environment. In such computing environments, data records 14 may originate from environments outside of computer system 100 and the integrity of the data record requires affirmation.

As shown in FIG. 1, an inline service provider 60 is in communication with first computer resource 10. The inline service provider is configured to check the integrity of the data contained in data records 14. In one embodiment, inline service provider 60 includes an intrusion prevention system that is configured to analyze respective data packets and data records and drop malicious packets of data. In some embodiments, the inline service provider 60 is a data loss protection system configured to provide data loss protection services that prevent sensitive or critical information from being relayed to unauthorized users or detect potential data breaches in the system.

As shown in FIG. 1, the inline service provider 60 is in communication with the first computing environment 10 and second computing environment 50 utilizing first network 20 and second network 30. A first switch 70 interfaces the first network 20 with the second network 30 enabling data records 14 or data packets to be transmitted from the first network to the second network 30 for subsequent processing by the inline service provider 60. First switch 70 interconnects first network 20 with second network 30. In one embodiment, first switch 70 includes a first memory 72. First memory 72 may also be independent of first switch 70. In one embodiment, the data records 14 and/or data packets are encrypted prior to transmission from first switch 70 to second network 30. In one embodiment, the data records and/or data packets are preferably encrypted and encapsulated by first switch 70. This may be done utilizing an application specific integrated circuit (ASIC) chip. The encapsulated and encrypted data records and/or data packets are received by second network 30. In one embodiment, the encrypted and encapsulated data records and/or data packets are transmitted to second switch 80. Second switch 80 may include a decryption mechanism such as an application specific integrated circuit (ASIC) chip. In an additional embodiment, Internet Protocol Security (IPSec) may be utilized to authenticate and encrypt each data packet. Internet Protocol Security operates in the Internet Layer of the Internet Protocol Suite. Second switch 80 may include a second memory 82. Second memory 82 may be independent from the second switch. The unencrypted and unencapsulated data is delivered to the inline service provider for processing. The results of the of the inline service processing is delivered back to the second switch, the second network to the first switch, and from the first switch to the first network and ultimately to the second resource.

Figure 2:
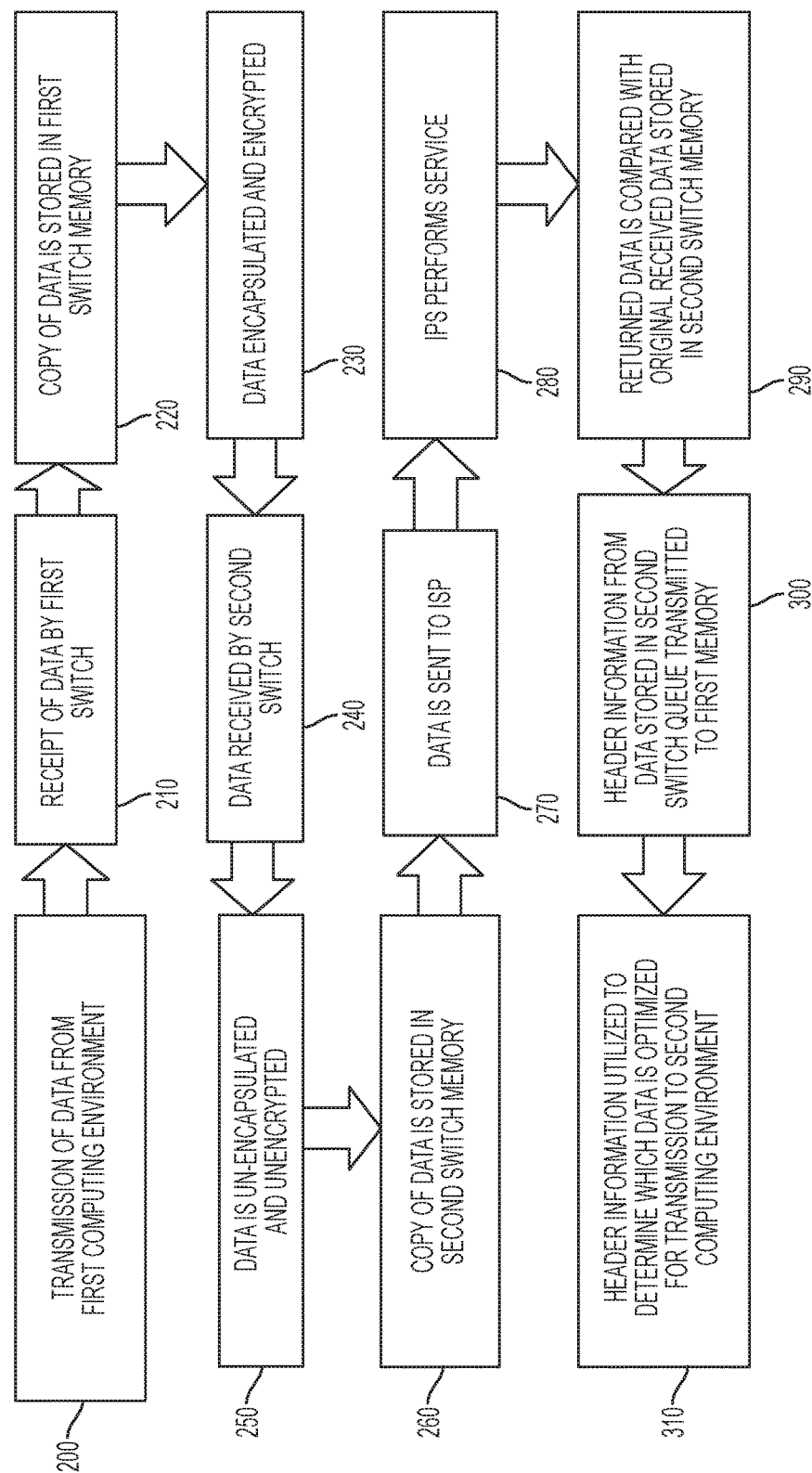
FIG. 2 shows the flow process of a data packet according to one or more embodiments of the teachings herein.

FIG. 2 illustrates one method of optimizing packet flow in an overlay network. As shown in FIG. 2, a predetermined data record is identified for transmission from the first computing environment to the second computing environment. This data record is transmitted from the first computing environment at step 200 over a network or bus and is received by a first switch at step 210. A copy of the data record is stored in the memory of the first switch and is queued for subsequent retrieval. The data record preferably has a header or other identifying feature. After a copy of the data record is stored in the memory of the first switch at step 220, the data record is processed for transmission over the switch for eventual processing by an inline service provider connected with a second network. In one embodiment at step 230 the date record is encapsulated and encrypted and transmitted preferably within a data packet from the switch to a communication system and received by the second network and ultimately received by the second switch at step 240. Once received by the second switch at step 240, the data record and/or data packet is unencapsulated and unencrypted at step 250 for subsequent processing by an inline service provider. Once the data record is unencapsulated and unencrypted, a copy of the data record is stored in memory at step 260. Preferably the memory is associated with the second switch as a copy is stored in the queue with the respective header information or other key identifier which identifies the respective data record.

After a copy of the data record is stored in the queue with the associated header information the data record is transmitted from the second switch at step 270 to an inline service provider which is in communication with a second network. At step 280, the inline service provider performs its associated processing task upon the respective data record. From this processing, the respective data record may be maintained or is determined not to be suitable for ultimate transmission from the first computing environment to the second computing environment based on criteria established by the inline service provider. Additionally, the inline service provider may perform an additional function and establish a new data record for subsequent transmission to the second computing resource based upon the particular operation of the inline service provider.

The data record returned from the inline service provider is compared at step 290 with the original data record which was received by the second switch and stored in a queue in memory. If the returned data record matches the original data record stored in the queue, then the inline service provider determines that the original data record as originally transmitted from the first computing environment is suitable and in condition for being transmitted and received by the second computing environment. As a copy of the original data record was previously stored in memory on the side of the network associated with the second computing resource at step 220, only a data identifier is necessary to identify which data records are suitable for transmission from the first computing resource to the second computing resource. As shown at step 300 in one embodiment, the header information for the data record stored in the second queue is utilized for identifying the respective data record which has been identified as being suitable for transmission from the first computing environment to the second computing environment by the inline service provider. The header from the data record returned from the inline service provider is compared with a header with an associated data record stored in the second queue. This header is transmitted at step 300 to the first queue. As only the header is transmitted, and not the related data, the header does not require to be encapsulated or encrypted. The omission of transmitting the entire processed data record in an encrypted and encapsulated format saves on the overhead resources. For instance, less bandwidth is required and less processing time is required. When the header transmitted at step 300 is received by the first memory, the header is utilized for identifying the data record stored in the first memory queue at step 310. Once identified, this record is transmitted from the first memory to the second computing resource.

Figure 3:
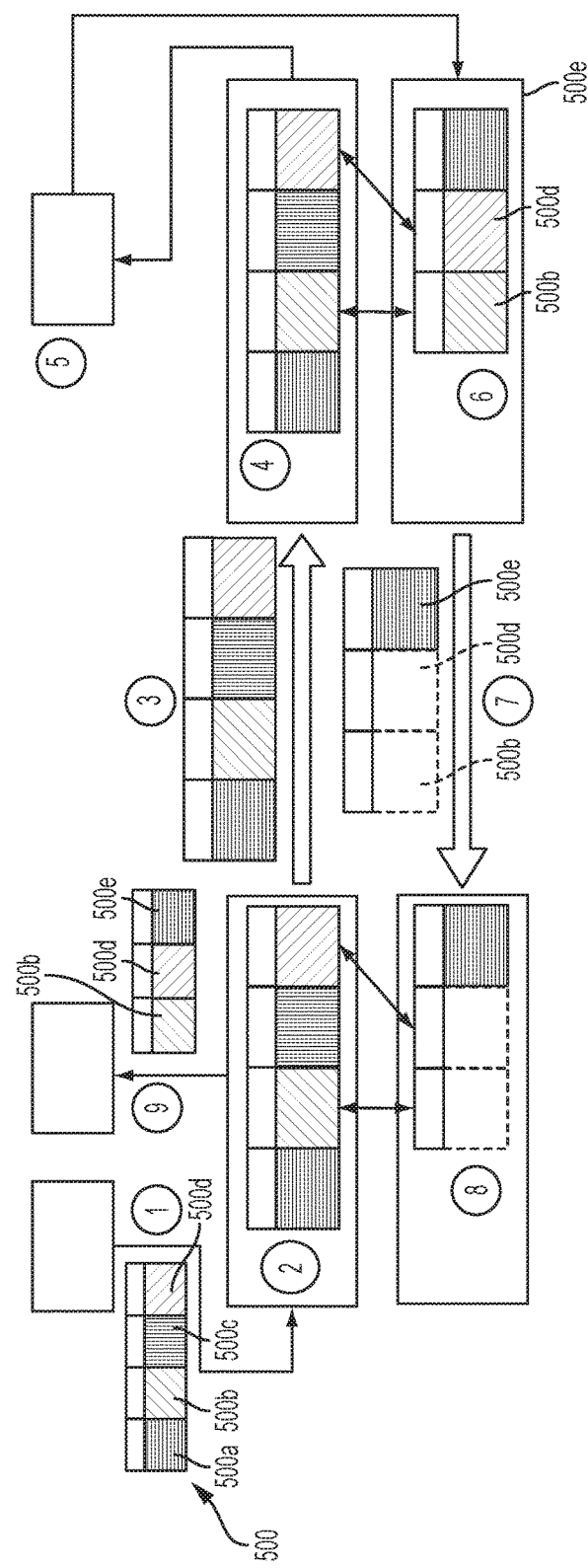
FIG. 3 shows a flow chart of an optimization process for packet data flow according to one or more embodiments.

FIG. 3 illustrates the flow of the respective data records and data packets from a first computing resource to a second computing resource according to one embodiment of the invention. As shown in FIG. 3, at 1, the first computing resource or tenant of a virtual machine is attempting to transmit first data packet 500 which contains data records 500*a*, 500*b*, 500*c*, and 500*d* with their respective headers. The data records are identified throughout the flow by their respective hash configuration. At 2, the packets are directed to a first switch and stored in a queue in the memory of the first switch. Additional memory configurations may be utilized and are not necessarily associated with the first switch. At 3, the data packet and/or associated data records are encrypted and encapsulated and transmitted to the second switch over a network. At 4, the data packet and/or associated data records are received by the second switch and unencrypted and unencapsulated. The unencrypted and unencapsulated data records are stored in a memory associated with the second switch and queued for subsequent comparison. At 5, the data packets and/or data records are transmitted to an inline service provider for processing. From the processing, the data records are identified as being suitable for transmission from the first computing resource to a second computing resource. As shown at 6, in this illustration, only the original data records 500*b* and 500*d* are returned from the inline service provider as being suitable for transmission from the first tenant to the second tenant. In this embodiment, the inline service provider has created a new data record 500*e* which may be transmitted to the second computing resource. At 6, the returned data records are compared with the data records originally queued and stored in the second memory. From this comparison, it is identified that only original data records 500*b* and 500*d* require subsequent processing. As data records 500*b* and 500*d* were originally transmitted by the first switch and a copy of the respective data records of 500*b* and 500*d* are maintained in the queue in the first memory, only the respective headers are required to be further processed. In this embodiment, the headers are utilized for identifying the respective data records however other identification attributes may be utilized while not requiring the subsequent encryption or encapsulation of the identifier as it is transmitted back to the first switch and utilized for the identifying the respective data records stored in the first queue.

In FIG. 3, at 7, the headers of data records 500*b* and 500*d* are transmitted over the respective networks and received by the first switch. In this embodiment, the data size of the information transmitted over the second network to the first network is substantially less than if the entire data record had been transmitted. The data itself is not re-sent, nor are additional overhead resources necessary as the identifiers do not require encapsulation or encryption. By requiring fewer resources and transmitting fewer data, less bandwidth is required and less processing time is required. These efficiencies result in an increased performance of the system by processing more data in a shorter time frame. At 8, the headers are compared with the original data records stored in the first queue, and the associated data records are identified. At 9, the complete data record originally stored in the first queue which has been deemed suitable for transmission to the second computing resource and associated with data records 500*b* and 500*d* is transmitted from the first queue to the second computing resource.

As shown in FIG. 3, in one embodiment, newly created data record 500*e* is also transmitted from the inline service provider to the second computing resource. As data record 500*e* was not originally present and queued in the first queue, the entire data record is required to be transmitted. In this circumstance, as the entire data record is being transmitted, it may be necessary to encapsulate and encrypt data record 500*e*.

Figure 4:
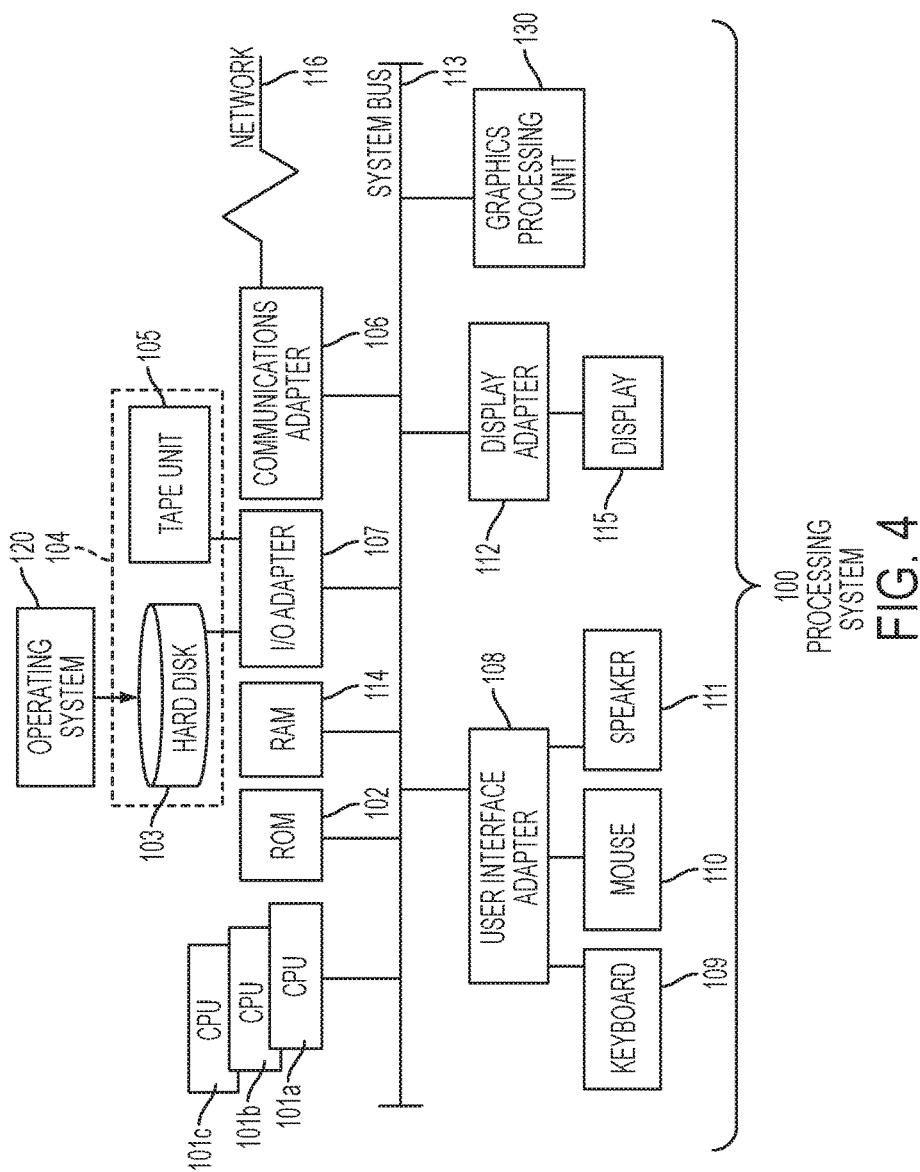
FIG. 4 shows a computer system according to an embodiment.

Referring to FIG. 4, there is shown central processing system 100 according to one or more embodiments. The system 100 has one or more central processing units (processors) 101*a*, 101*b*, 101*c*, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 4 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling processing system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnect to bus 113 via user interface adapter 108, which may include, for example, a Super I/O chip integrating multiple device adapters into a single integrated circuit.

Thus, as configured in FIG. 4, the processing system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components shown in FIG. 4.

In this illustrative example, the advantage of the embodiment as shown enables a reduction in overhead resources associated with the transmission of data over separate networks in order to provide inline services on the data. The transmission of the data requires that the data be encrypted and encapsulated in order to protect the data over the networks. Such endeavors incur significant overhead processing resources including increased bandwidth requirements and delay in processing time due to the requirement of transmitting complete data packets. By eliminating the requirement of transmitting the entire data record back from the inline service provider through the utilization of queued data and associated header information, the need for overhead resources is greatly reduced. Additionally, by re-transmitting only the header information, and not the full data records, the processing time is improved and the bandwidth requirement is reduced.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for managing data flow in a network between two resources, the method comprising:

obtaining, using a processor system, a data record from a first resource in response to a request from a second resource;

storing, using the processor system, the data record and an associated data record identifier in a first memory of a first switch associated with the first network;

transmitting, via the first switch, the data record and the associated data record identifier from a first network to a second network;

storing the data record and the associated data record identifier in a second memory of a second switch associated with the second network;

determining by an inline service provider whether the data record is suitable for transmission from the first resource to the second resource, wherein the inline service provider includes a data loss protection system;

based on a determination that the data record is suitable for transmission by the inline service provider, transmitting only the data record identifier stored in the second memory to the first switch; and retrieving the data record stored in the first memory associated with the data record identifier for transmission to the second resource.

2. The method of claim 1 wherein the data includes a data header and the method further comprises utilizing the data header as the data identifier.

3. The method of claim 1 further comprising encapsulating or encrypting the data prior to transmitting the data to the second switch.

4. The method of claim 3 further comprising utilizing IPSec for encrypting the data prior to transmitting the data to the second switch.

5. The method of claim 1 wherein the inline service provider further includes an intrusion prevention system.

6. The method of claim 1 wherein the data identifier is transmitted from the second switch to the first switch in an unencrypted format.

7. The method of claim 1 wherein the data record is modified by the inline service provider.

8. The method of claim 1 further comprising comparing the data record identifier received from the second memory to the data record stored in the first memory.

9. A system for transmitting data flow in a network, the system comprising:
a first resource having a data record and associated data record identifier;
a second resource in communication with the first resource via a first network;
a first switch communicating a first network with a second network;
a first memory in communication with the first resource and first switch for receiving the data record and associated data record identifier from the first resource and storing a copy of the data record and data record identifier for potential subsequent transmission to the second resource if transfer of the data is approved by an inline service provider;
a second switch in communication with the first switch for receiving the data record;
an inline service provider providing services on the data resulting in processed data wherein the inline service provider includes a data loss protection system;
a second memory in communication with the second switch for storing a copy of the data record for subsequent comparison upon receiving the processed data;
a processor configured to compare the processed data with the copy of the data record stored in the second memory to determine whether the data record is suitable for transmission to the second resource; and
wherein the processor is further configured to transmit the data record identifier identifying the data record stored in the first memory when the data record is determined suitable for transmission to the second resource; and
wherein only the data record identifier is transmitted to the first switch from the second switch.

10. The system of claim 9, wherein a processor is further configured to encapsulate and encrypt the data prior to transmission from the first switch to the second switch.

11. The system of claim 9, further comprising utilizing IPSec for encrypting the data prior to transmitting the data to the second switch.

12. The system of claim 9, wherein the inline service provider further includes an intrusion prevention system.

13. A computer program product for managing data flow in a network between two resources, the computer program product comprising a computer readable storage medium having program instructions embodied therewith, wherein the computer readable storage medium is not a transitory signal per se, the program instructions readable by a processing circuit to cause the processing circuit to perform a method comprising:
obtaining, using a processor system, a data record from a first resource in response to a request from a second resource;
storing, using the processor system, the data record and an associated data record identifier in a first memory of a first switch associated with the first network;
transmitting, via the first switch, the data record and the associated data record identifier from a first network to a second network;
storing the data record and the associated data record identifier in a second memory of a second switch associated with the second network;
determining by an inline service provider whether the data record is suitable for transmission from the first resource to the second resource, wherein the inline service provider includes data loss protection system;
based on a determination that the data record is suitable for transmission by the inline service provider, transmitting only the data record identifier stored in the second memory to the first switch; and
retrieving the data record stored in the first memory associated with the data record identifier for transmission to the second resource.

14. The computer program product of claim 13, further including determining, using the processor system, if a new data record has been created by an inline service provider, and transmitting the new data record to the first switch in an encrypted format.

15. The computer program product of claim 13, wherein the determining if the data record is suitable for transmission from a first resource to a second resource includes comparing data processed by the inline service provider with the data record stored in said second memory.

16. The computer program product of claim 13, wherein the data record identifier is a header associated with the data record stored in the first memory.

17. The computer program product of claim 13, wherein the data identifier is transmitted in an unencrypted format from the second switch to the first switch.

* * * * *